Feb. 18, 1958     F. W. SHOWALTER     2,823,961
SADDLE BEARING
Filed Sept. 21, 1953     7 Sheets-Sheet 3
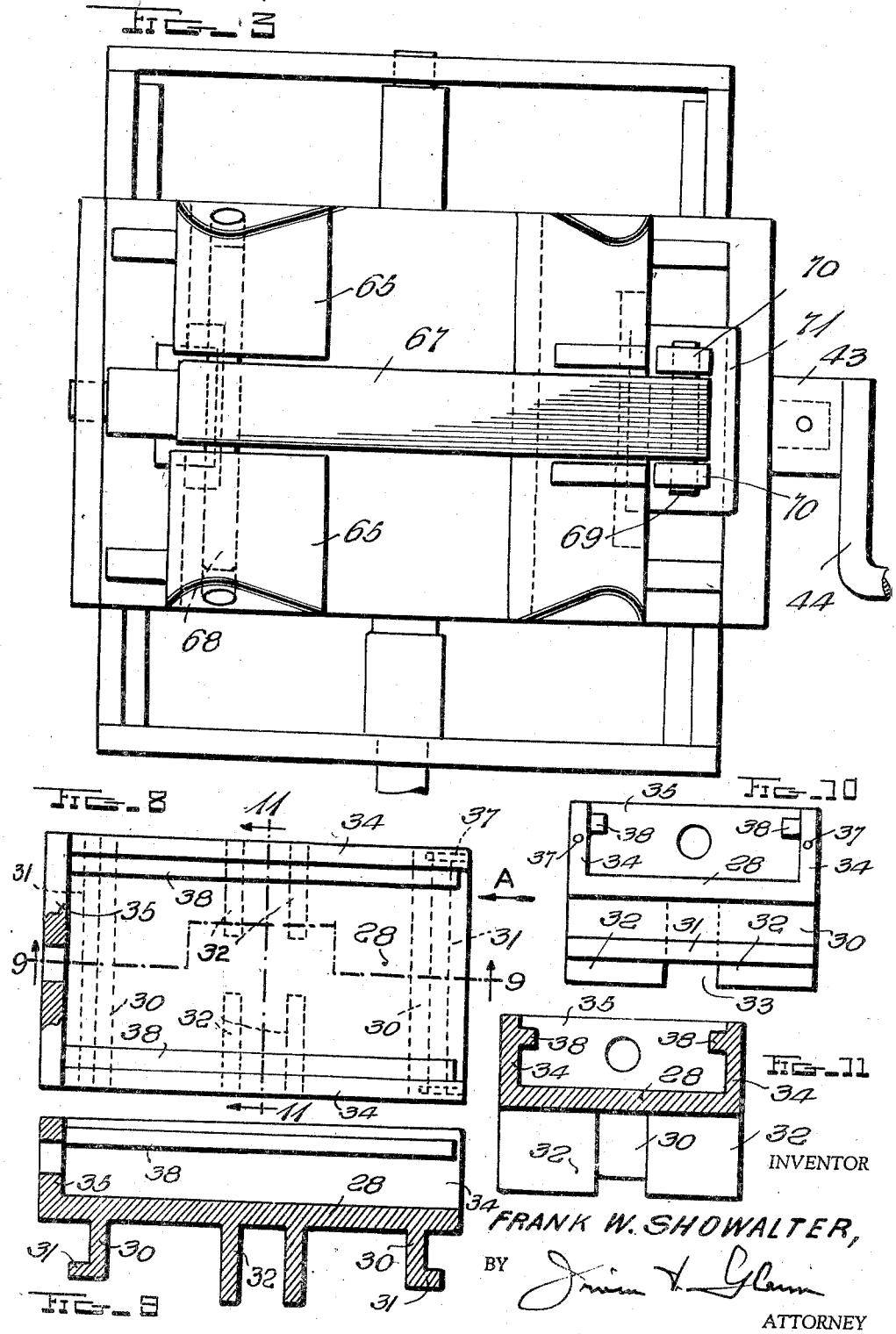
INVENTOR
FRANK W. SHOWALTER,
BY
ATTORNEY

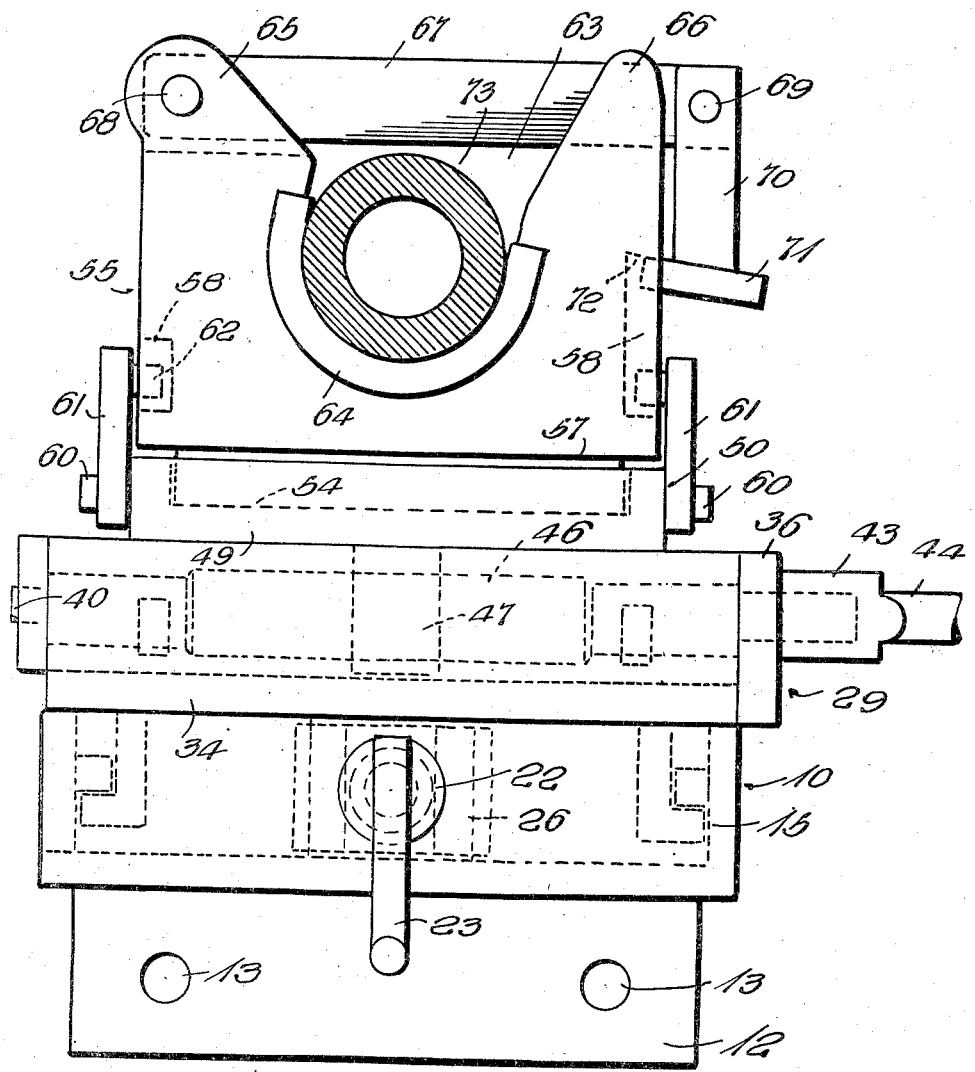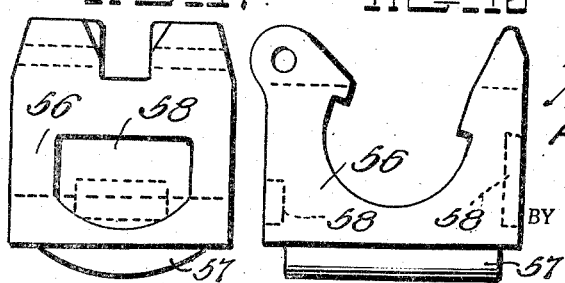

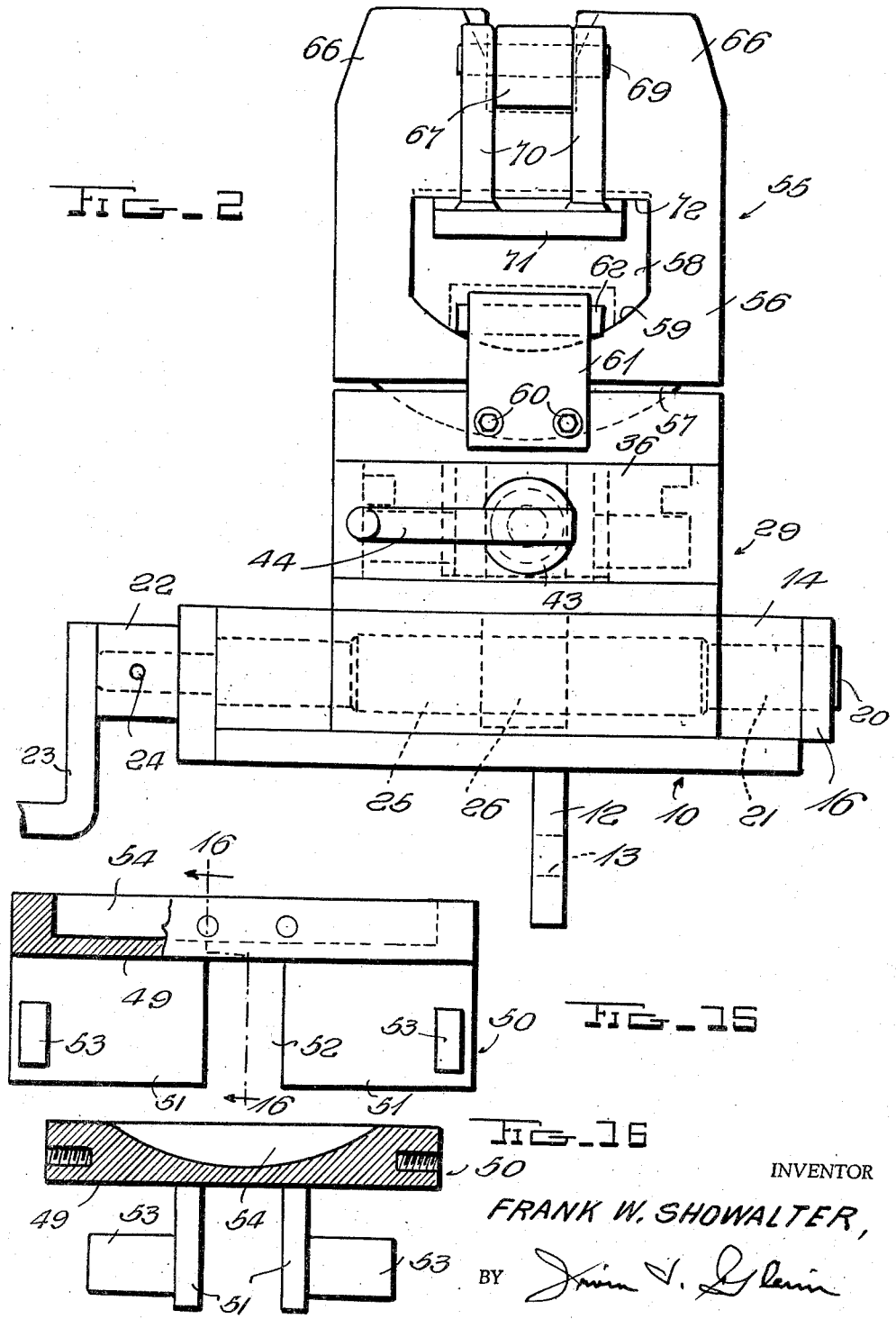

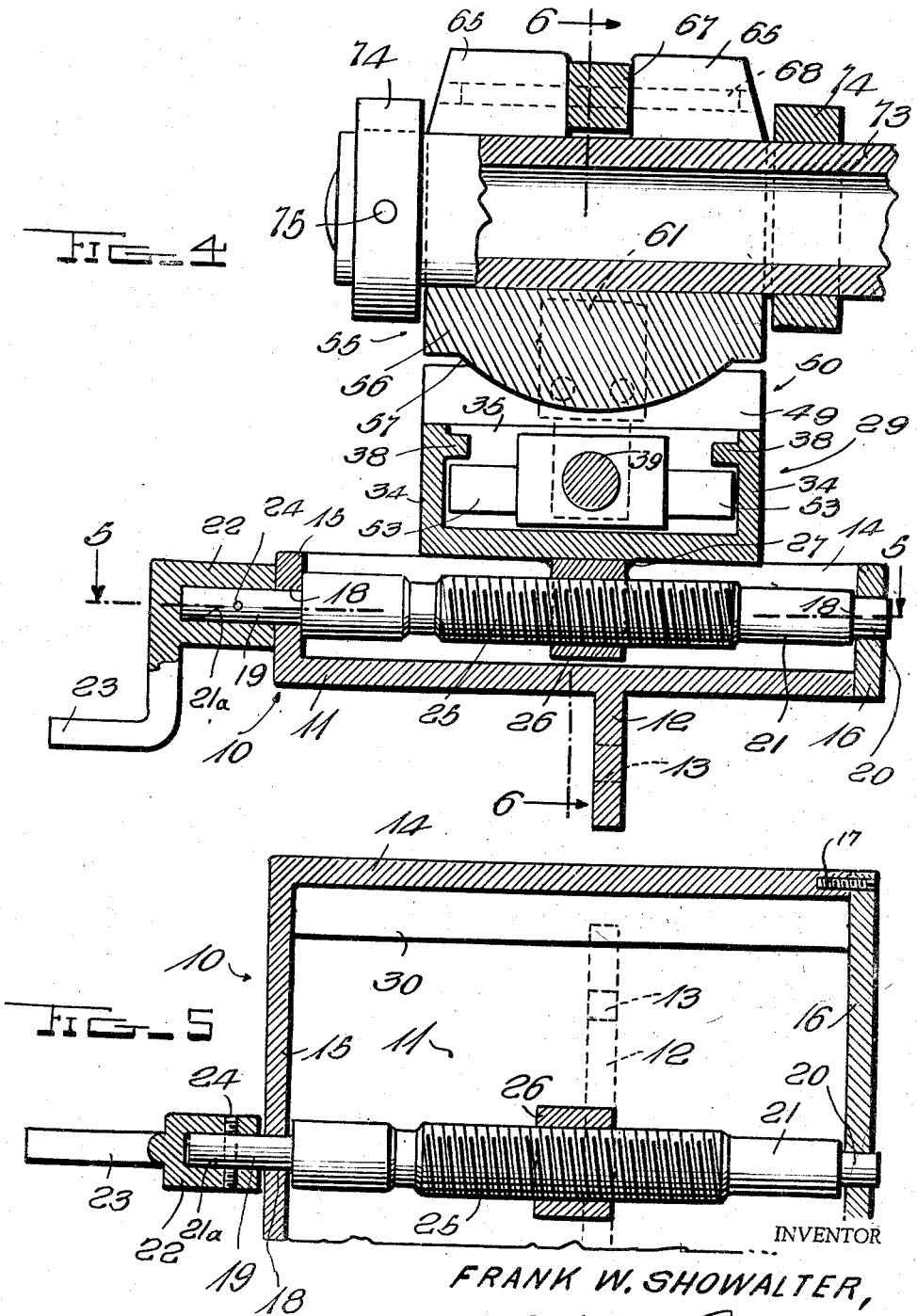

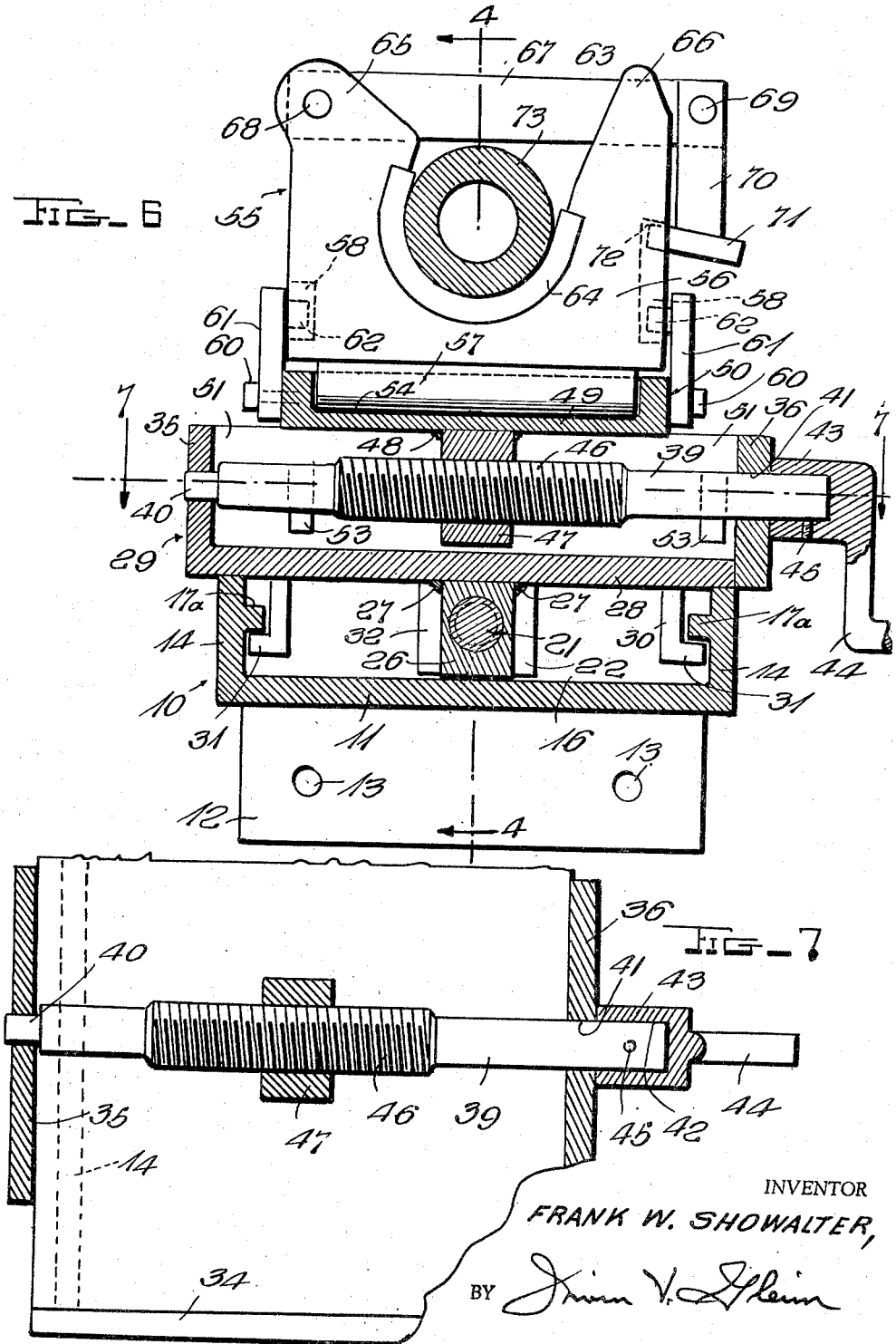

Feb. 18, 1958  F. W. SHOWALTER  2,823,961
SADDLE BEARING
Filed Sept. 21, 1953  7 Sheets-Sheet 6
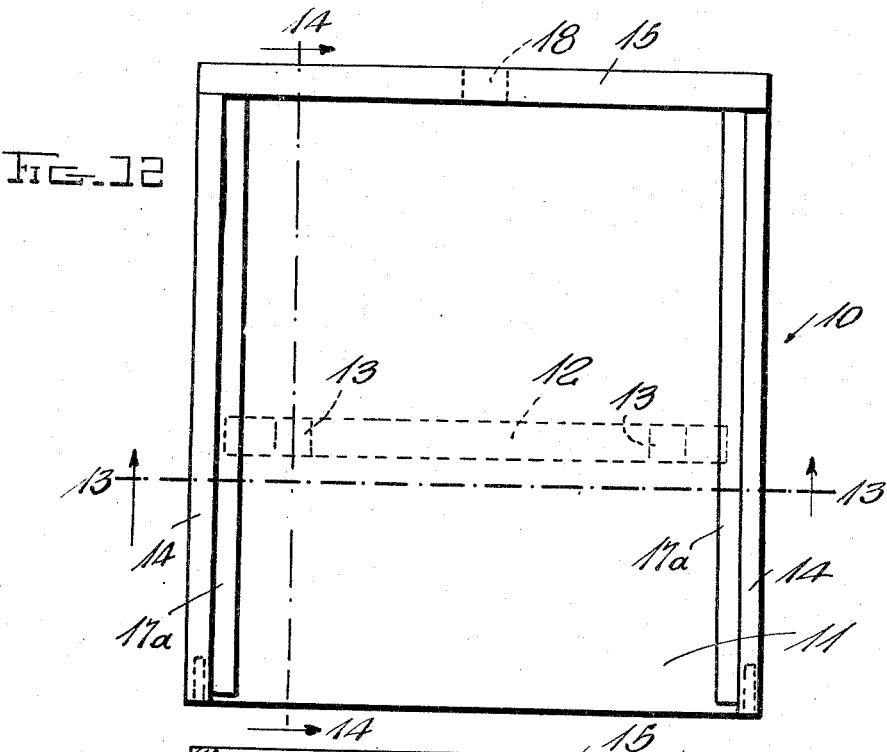
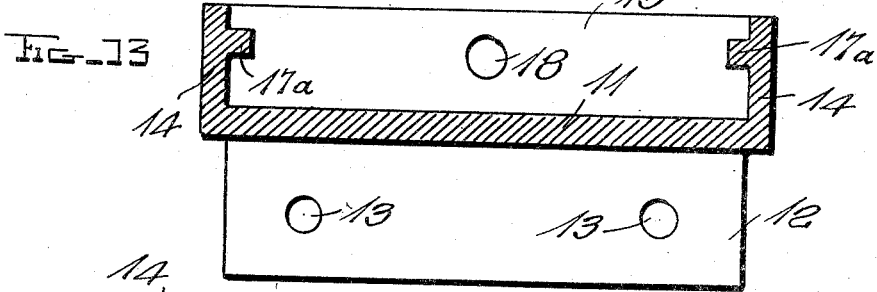
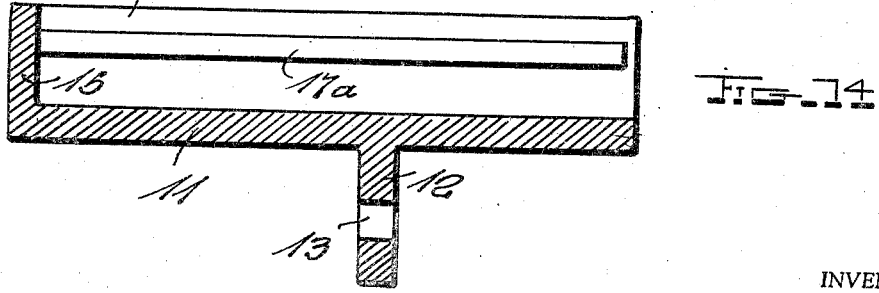
INVENTOR
FRANK W. SHOWALTER,
BY
ATTORNEY Feb. 18, 1958 F. W. SHOWALTER 2,823,961
SADDLE BEARING
Filed Sept. 21, 1953 7 Sheets-Sheet 7
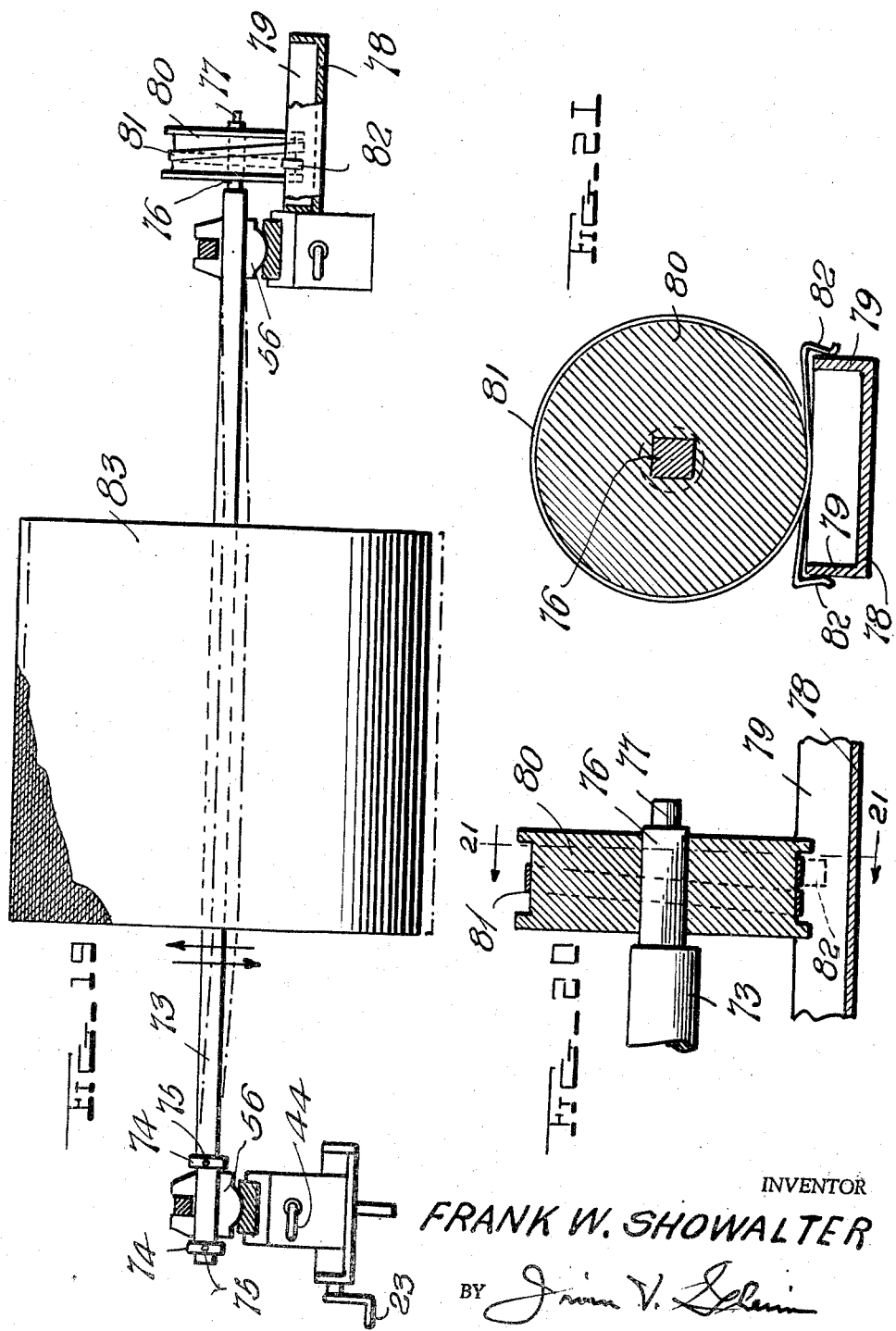
INVENTOR
FRANK W. SHOWALTER
BY
ATTORNEY

United States Patent Office 2,823,961
Patented Feb. 18, 1958

2,823,961

SADDLE BEARING

Frank W. Showalter, Dayton, Ohio, assignor to The American Envelope Company, West Carrollton, Ohio, a corporation of Ohio Application September 21, 1953, Serial No. 381,370

5 Claims. (Cl. 308—15)

The present invention relates to a saddle bearing and it consists in the combination, constructions and arrangements of parts herein described and claimed.

Generally the invention comprises an improved saddle bearing to support the ends of an arbor carrying a roll of paper and is particularly useful in apparatus of the character set forth in my prior Patent No. 2,585,859 dated February 12, 1952, and entitled "Turntable for Paper Roll Stands." The device consists essentially of a saddle block having a substantially centrally disposed depression provided with a suitable bearing in which is adapted to be fitted one end of the arbor of a paper roll. A novel latch is provided for maintaining the arbor in the bearing block and the bearing block itself is provided with means whereby it may tilt in such manner that the support will at all times remain in parallelism with the arbor. Novel means are provided for moving the block longitudinally and laterally with respect to the longitudinal axis of the arbor. The device possesses many other novel features which will be set forth hereinafter.

It is accordingly an object of the invention to provide an improved saddle bearing for the arbors of paper rolls.

Another object of the invention is to provide, in a device of the character set forth, novel means for latching an arbor therein.

Another object of the invention is to provide, in a device of the character set forth, novel means for moving the same both laterally and longitudinally with respect to the longitudinal axis of an arbor supported thereby.

A further object of the invention is to provide, in a device of the character set forth, novel self-aligning means for providing alignment of a saddle bearing, thereby compensating for the deflection of an arbor caused by the weight of a paper roll.

Another object of the invention is to provide, in a device of the character set forth, a novel bearing and mounting therefor, such bearing and its mounting forming parts of the invention.

Still another object of the invention is to provide a novel brake forming a part of the invention.

Another object of the invention is the provision of novel supporting means for the aforesaid brake when the latter is in disengaged condition.

Other objects and advantages of the invention will be apparent from the following description, the accompanying drawings and the appended claims.

In the drawings—

Figure 1 is a side elevational view of an embodiment of the invention,

Figure 2 is an end elevational view of Figure 1,

Figure 3 is a plan view of the device shown in Figures 1 and 2,

Figure 4 is a sectional view taken along line 4—4 of Figure 6,

Figure 5 is a sectional view taken along line 5—5 of Figure 4,

Figure 6 is a sectional view taken substantially along line 6—6 of Figure 4,

Figure 7 is a fragmentary sectional view taken substantially along line 7—7 of Figure 6, Figure 8 is a plan view, partly broken away, of an upper slide base forming a part of the invention, Figure 9 is a sectional view taken along line 9—9 of Figure 8, Figure 10 is an end elevational view of Figure 8, Figure 11 is a sectional view taken along line 11—11 of Figure 8, Figure 12 is a plan view of a lower slide base forming a part of the invention, Figure 13 is a sectional view taken along line 13—13 of Figure 12, Figure 14 is a sectional view taken along line 14—14 of Figure 12, Figure 15 is a side elevational view, partly broken away, and partly in section, of a support member forming a part of the invention, Figure 16 is a sectional view taken substantially along line 16—16 of Figure 15, Figure 17 is an end elevational view of a saddle forming a part of the invention, Figure 18 is a side elevational view of Figure 17, Figure 19 is a diagrammatic front elevational view, partly in section and partly broken away, Figure 20 is an enlarged fragmentary sectional view illustrating a brake forming a part of the invention, and Figure 21 is a sectional view taken along line 21—21 of Figure 20.

Referring more particularly to the drawings, there is shown therein a device of the character set forth comprising a lower slide base generally designated at 10 and including a rectangular horizontally extending platform 11 transversely affixed to the underside of which is a vertically dependent anchor plate 12 provided with a pair of openings 13 whereby the same may be affixed to a suitable standard (not shown). Extending upwardly from the platform 11 is a pair of side walls 14 and an end wall 15. A removable end wall 16 is affixed to the remaining side by means of screws 17 or the like. Extending inwardly from each of the side walls 14 adjacent the upper end thereof is a horizontal track 17a and each of the end walls 15 and 16 is centrally provided with a circular opening 18 for the reception therein of reduced portions 19 and 20 of a shaft 21, the reduced portion 20 being journaled in the end wall 16 while the reduced portion 19 extends through the end wall 15 and into a socket 21a formed in a hub 22 of a handle 23, the hub 22 being affixed to the reduced portion 19 by means of a set screw 24 or the like.

The shaft 21 has the central portion thereof threaded, as indicated at 25 which threaded portion extends threadedly through a block 26 which preferably floats between vertically dependent plates 32 but may be welded, as indicated at 27, centrally to the underside of a horizontally extending rectangular platform 28 of an upper slide base generally designated at 29, and shown in detail in Figures 8 to 11, inclusive.

The platform 28 has affixed transversely thereof in inwardly spaced relation from each of its ends a dependent plate 30 each of which is provided with an outwardly extending flange 31 which engages beneath one of the trackways 17a in each case. The platform 28 is also centrally provided with a pair of transversely extending, spaced vertically dependent plates 32 each of which is centrally provided with an opening 33, it being apparent that the space between the plates 32 provides means for the passage therethrough of the shaft 21 and that the sides of the plates 32 adjacent the openings 33 abut against the block 26.

Extending upwardly from the platform 28 is a pair of side walls 34 and a permanent end wall 35. A removable end wall 36 is attached to the side walls 34 by screws 37 or the like.

Extending inwardly from each of the side walls 34 adjacent the upper end thereof is a horizontal track 38. A shaft 39 is provided with a reduced end 40 which is journaled centrally in the end wall 35 and its other end extends through a central opening 41 in the end wall 36 and thence into a socket 42 formed in a hub 43 of a handle 44, the hub 43 being secured to the shaft 39 by means of a set screw 45 or the like.

The shaft 39 is centrally threaded, as indicated at 46, and extends threadably through a block 47 which preferably floats between vertically dependent plates 51 but may be welded, as indicated at 48, centrally upon the underside of a platform 49 of a support member generally designated at 50 and shown in detail in Figures 15 and 16.

The support member 50 has centrally affixed to the bottom thereof a pair of spaced longitudinally extending dependent plates 51 each of which is provided with a central opening 52 for the reception therein of a block 47 and each of the plates 51 is provided adjacent each of its outer ends with an outwardly extending wing 53 which wing 53 engages beneath the tracks 38. The platform 49 is provided in its upper face with a rounded depression 54.

A saddle or bearing block is generally indicated at 55 and consists of a body 56 to the underside of which is integrally fixed a rounded bottom 57 adapted to slidably engage in the opening 54 to allow the body to take adjusted positions in a clockwise or counterclockwise direction as viewed, for example, in Figure 2. In each side of the body 56 adjacent the lower end thereof there is provided a recess 58 having a rounded bottom 59 and to each side of the member 50 there is affixed by means of screws 60 or the like a vertically extending retaining plate 61 to the upper end of which is affixed an inwardly directed lug 62, the lugs 62 lying in each case in one of the recesses 58. Lug 62 retains block 56 having rounded bottom 57 in the opening 54 in platform 49.

The body 56 is provided in its upper face with a downwardly and slightly angularly directed opening in the lower portion of which is mounted a substantially U-shaped bronze or other suitable type bearing 64. The block 56 is also transversely bifurcated to form a pair of ears 65 at one side thereof and a pair of ears 66 at the other side thereof.

A retainer bar 67 is pivotally mounted at one of its ends upon a pin 68 extending between the ears 65 and the free end thereof extends normally between the ears 66 and has pivotally mounted thereon, as indicated at 69, a latch bar 70 provided with an inwardly and upwardly directed latch plate 71 at its lower end, such latch plate being adapted to engage beneath a lip 72 formed in the upper end of the adjacent opening 58.

Referring now to Figures 19 to 21, inclusive, it will be seen that a collar 74 is affixed to the arbor 73 upon either side of the block 55 by means of a set screw 75 or the like. One end of the arbor 73 is provided with a reduced end portion 76 which is square in cross sectional area and with a rounded outer end portion 77.

A trough or pan 78 is affixed to the outer side of the adjacent base 10 directly below the squared end 76 and is provided with upwardly extending sides 79. A brake drum 80 is removably mounted upon the squared portion 76 and a brake band 81 encircles the same and is provided at each of its ends with a hook 82 which is adapted to engage over one of the sides 79 of the pan 78.

In operation, it will be seen that when it is desired to support one end of a paper roll 83 by means of the presently described device, in order to properly position the opening 63 for the reception therein of one end of the arbor 73, it is only necessary for the adjustment of the device longitudinally with respect to the longitudinal axis of the arbor 73 to operate the handle 23. This action causes the shaft 21 to revolve thereby moving the block 26 longitudinally with respect to the shaft 21 and thereby moving the upper slide base and the elements carried thereby longitudinally with respect to the longitudinal axis of the arbor 73. In order to adjust the device laterally with respect to the longitudinal axis of the arbor 73, it is only necessary to manipulate the handle 44 which causes a turning of the shaft 39 and thus a longitudinal movement of the block 47 with respect to the shaft 39. Since the support member 50 is carried by the block 47, member 50 and the elements supported thereby will be caused to move laterally with respect to the longitudinal axis of the arbor 73.

As the rolls of paper are placed in, and the empty arbors removed from the saddle bearings with a hoist, it sometimes happens that an operator neglects to release arbor 73 by actuating latch 71 and swinging retaining bar 67 from interfering with the removal of arbor 73. Should the hoist try to remove an arbor with the retaining bar 67 in locked position, then pin 69 which is made of a suitable material, as for example, aluminum, and so designed that it will readily shear and prevent damage to any of the mechanism.

Having thus positioned the block 55 for the proper reception in the opening 63 thereof of the arbor 73, the arbor 73 may now be mounted therein, it being apparent that the bearing 64 will bear the weight thereof. When this is accomplished, the retainer bar 67 is rotated upon its pin 68 in a clockwise direction as viewed in Figure 1 whereupon the latch head 71 may be engaged beneath the lip 72 to thus retain the arbor 73 in position against accidental displacement therefrom.

Since two or more rolls of paper 83 may be unwound simultaneously, it is necessary that the edges of all such rolls remain in alignment. This final alignment is made by turning the crank 23 thus moving the arbor 73 longitudinally. Lateral adjustment is provided by the handle 44 as the edges of each roll of paper must unwind in parallelism with all other rolls to prevent wrinkles appearing in the sheet or sheets of paper.

It will also be apparent that since the bottom extension 57 of the block 56 is rounded and slidably mounted in the opening 54 in the platform 49, that the block 55 will accept angular movement due to the weight of the paper roll 83 carried by the arbor 73 as shown in dotted lines in Figure 19, and that as paper is used or removed from the roll 83 carried by the arbor 73 that the arbor 73 will be less and less bent by the weight thereof and will accordingly gradually assume a position more nearly horizontal, as indicated in full lines in Figure 19. As this action takes place, the block 55 will, of course, be allowed to move to accept such corrected positions due to the mounting of the member 57 in the opening 54 as aforesaid. It will also be apparent that since the opening 63 is not directly vertical but slightly angular with respect to the vertical that "climbing" of the arbor 73 during rotation thereof is prevented thus insuring more efficient operation of the device.

It will likewise be apparent that the purpose of the brake 81 is to prevent slack from appearing in a sheet of paper as it is unwound from its roll 83. To facilitate the loading of a new roll of paper, the brake 81 is first dismounted from the drum 80 by disengaging the hooks 82 thereof from the sides 79 of the trough 78 whereupon the drum 80 may be removed from the squared portion 76 and allowed to rest in the trough 78, which latter is so positioned with respect to the longitudinal axis of the arbor 73 that it allows the drum 80 to fall only a small distance when it is so removed. To replace the drum 80 upon the squared portion 76, it is only necessary to tip the drum at a slight angle and to then slide the same toward the arbor until the hole in the drum is over the rounded end 77. The drum 80 is now turned to align its opening with the squared end portion 76 whereupon the drum may be readily pushed into place. This process eliminates lifting of the drums 80 and consequently lessens fatigue on the part of the operator while at the same time affording protection to the operator from accidental dropping of such drums upon his toes or feet.

While but one form of the invention has been shown and described herein, it will be readily apparent to those skilled in the art that many minor modifications may be made without departing from the scope of the invention which is defined in the appended claims.

What is claimed is:

1. A device of the character described comprising a pair of supports, an arbor mounted in said supports, a reduced portion at one end of said arbor having square cross sectional area, a brake drum removably mounted on said end portion, a trough carried by one of said supports directly below said end portion and said drum, a brake band encircling said drum, and a hook at each end of said band removably engageable with one side of said trough.

2. A device as defined in claim 1 wherein each of said supports comprises a lower base, an upper base mounted upon said lower base, means carried by said lower base for longitudinally moving said upper base, a platform mounted on said upper base, means carried by said upper base for transversely moving said platform, and an arbor-receiving saddle bearing mounted on said platform.

3. A device as defined in claim 1 wherein each of said supports comprises a lower base, an upper base mounted upon said lower base, means carried by said lower base for longitudinally moving said upper base, a platform mounted on said upper base, means carried by said upper base for transversely moving said platform, an arbor-receiving bearing block mounted on said platform, a retainer bar for said arbor pivotally mounted on said bearing block, and a latch carried by the outer end of said bar and engageable with said bearing block.

4. A device of the character described comprising a lower base, an upper base mounted upon said lower base, means carried by said lower base for longitudinally moving said upper base, a platform mounted on said upper base, means carried by said upper base for transversely moving said platform, an arbor-receiving bearing block mounted on said platform, an arbor retainer bar pivotally mounted on said bearing block and a latch carried by the outer end of said bar and engageable with said bearing block, said platform having a rounded depression in its upper face, and said bearing block having a rounded dependent portion receivable in said depression, said dependent portion having an axis extending in a vertical plane which is at right angles with respect to a vertical plane including the longitudinal axis of said bearing block, whereby said bearing block is tiltable with respect to its longitudinal axis.

5. A device of the character described comprising a lower base, an upper base mounted upon said lower base, means carried by said lower base for longitudinally moving said upper base, a platform mounted on said upper base, means carried by said upper base for transversely moving said platform, and an arbor-receiving bearing block mounted on said platform, said platform having a rounded depression in its upper face, and said bearing block having a rounded dependent portion receivable in said depression, said dependent portion having an axis extending in a vertical plane which is at right angles with respect to a vertical plane including the longitudinal axis of said bearing block, whereby said bearing block is tiltable with respect to its longitudinal axis.

References Cited in the file of this patent

UNITED STATES PATENTS

| | | |
|---|---|---|
| 212,767 | Tucker | Feb. 25, 1879 |
| 345,468 | Wilmott | July 13, 1886 |
| 539,045 | Everline | May 14, 1895 |
| 1,471,438 | Wright | Oct. 23, 1923 |
| 1,992,393 | Rawson | Feb. 26, 1935 |
| 2,465,356 | Cole | Mar. 29, 1949 |
| 2,498,336 | Kennedy | Feb. 21, 1950 |
| 2,502,894 | Schlums | Apr. 4, 1950 |
| 2,585,859 | Showalter | Feb. 12, 1952 |

FOREIGN PATENTS

| | | |
|---|---|---|
| 7,956 | Great Britain | 1914 |